Figure 1:
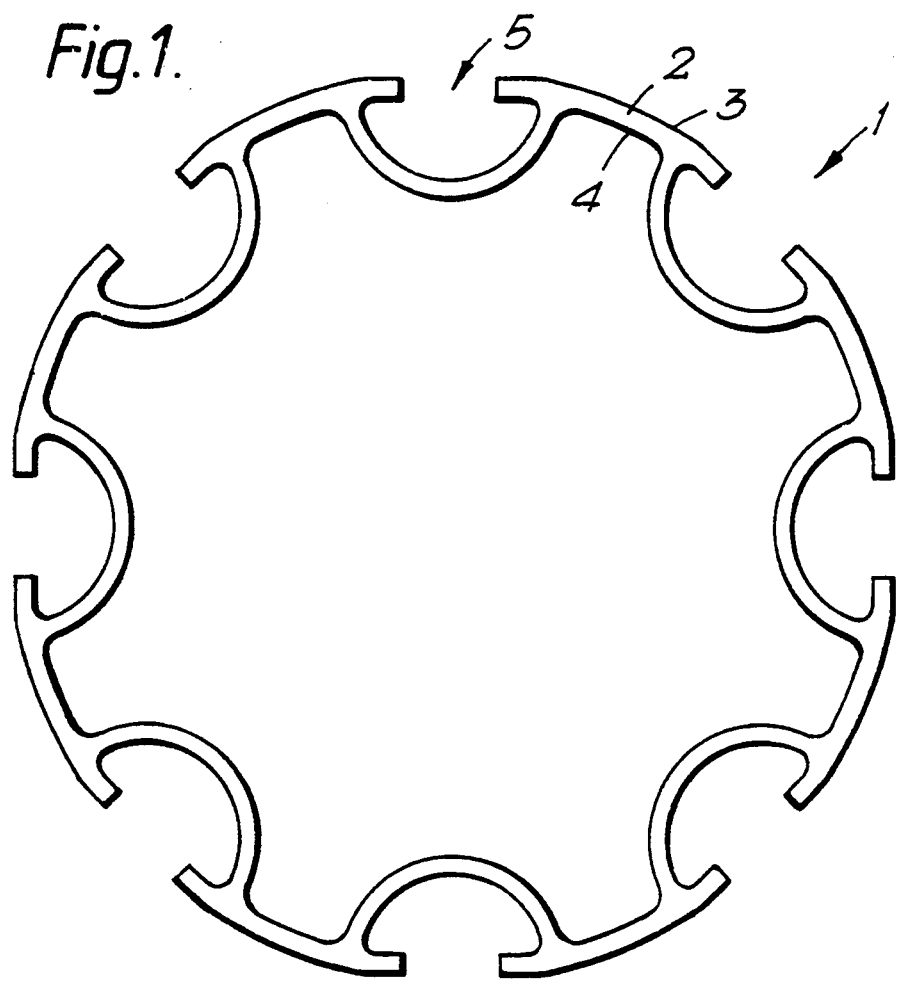

United States Patent [19]
Papadopoulos

[11] Patent Number: 5,344,258
[45] Date of Patent: Sep. 6, 1994

[54] SHORING SYSTEM: A CONNECTOR FOR A SHORTING SYSTEM

[75] Inventor: Demetrios G. Papadopoulos, Whitton, England

[73] Assignee: SGB Holdings Limited, Mitcham, England

[21] Appl. No.: 992,054

[22] Filed: Dec. 16, 1992

[30] Foreign Application Priority Data

Dec. 20, 1991 [GB] United Kingdom ............ 9127100.7

[51] Int. Cl.⁵ ............................................. E02D 17/04
[52] U.S. Cl. ...................................... 405/282; 403/49; 403/353
[58] Field of Search ............... 405/272, 282, 283, 278, 405/279, 281; 403/49, 353, DIG. 4

[56] References Cited

U.S. PATENT DOCUMENTS

| | | | |
|---|---|---|---|
| 865,080 | 9/1907 | Candee | 405/280 |
| 968,450 | 8/1910 | Conking | 405/278 |
| 1,841,647 | 1/1932 | Smith | 403/329 X |
| 2,128,428 | 8/1938 | Murray | 405/278 |
| 2,932,481 | 4/1960 | Breer et al. | 248/354.6 |
| 3,362,167 | 1/1968 | Ward | 405/282 |
| 3,470,699 | 10/1969 | Cox | 405/282 |
| 3,688,508 | 9/1972 | Taylor | 405/278 |
| 3,901,609 | 8/1975 | Gostling | 403/49 |
| 3,902,326 | 9/1975 | Laughenbach | 405/230 X |
| 4,657,442 | 4/1987 | Krings | 405/282 |
| 4,907,675 | 3/1990 | Saby | 182/178 |
| 4,986,690 | 1/1991 | Cooksey | 403/353 X |
| 5,048,875 | 9/1991 | Usui et al. | 285/319 |

FOREIGN PATENT DOCUMENTS

| | | |
|---|---|---|
| 2633147 | 1/1978 | Fed. Rep. of Germany . |
| 3102211 | 12/1981 | Fed. Rep. of Germany . |
| 3641349 | 6/1988 | Fed. Rep. of Germany . |
| 332026 | 7/1930 | United Kingdom . |
| 639129 | 6/1950 | United Kingdom . |
| 2234005A | 1/1991 | United Kingdom . |
| 2234776A | 2/1991 | United Kingdom . |

Primary Examiner—David H. Corbin
Attorney, Agent, or Firm—Arnold, White & Durkee

[57] ABSTRACT

A connector for a shoring system comprises a housing adapted to be mounted on a frame which is to be connected to legs which define the plurality of axially extending channels. The housing slidable receives a bolt. The bolt has a head shaped and dimensioned so that in one orientation axial movement of the bolt may introduce the head through the slot into the channel, and in an alternate orientation the bolt may not be withdrawn from the channel by axial movement. The bolt is associated with means adapted to rotate the bolt and to move the bolt axially relative to the housing.

5 Claims, 5 Drawing Sheets

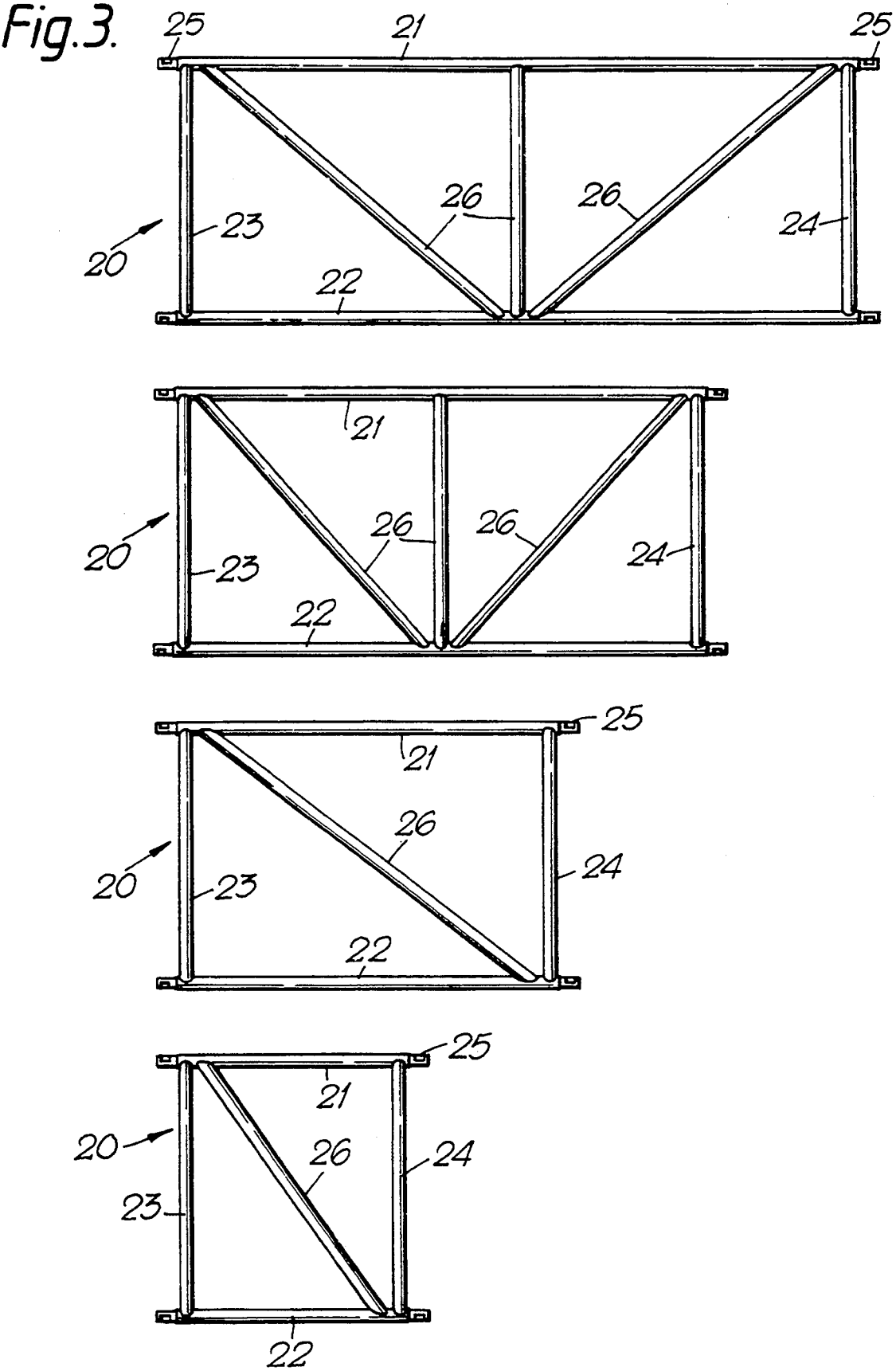

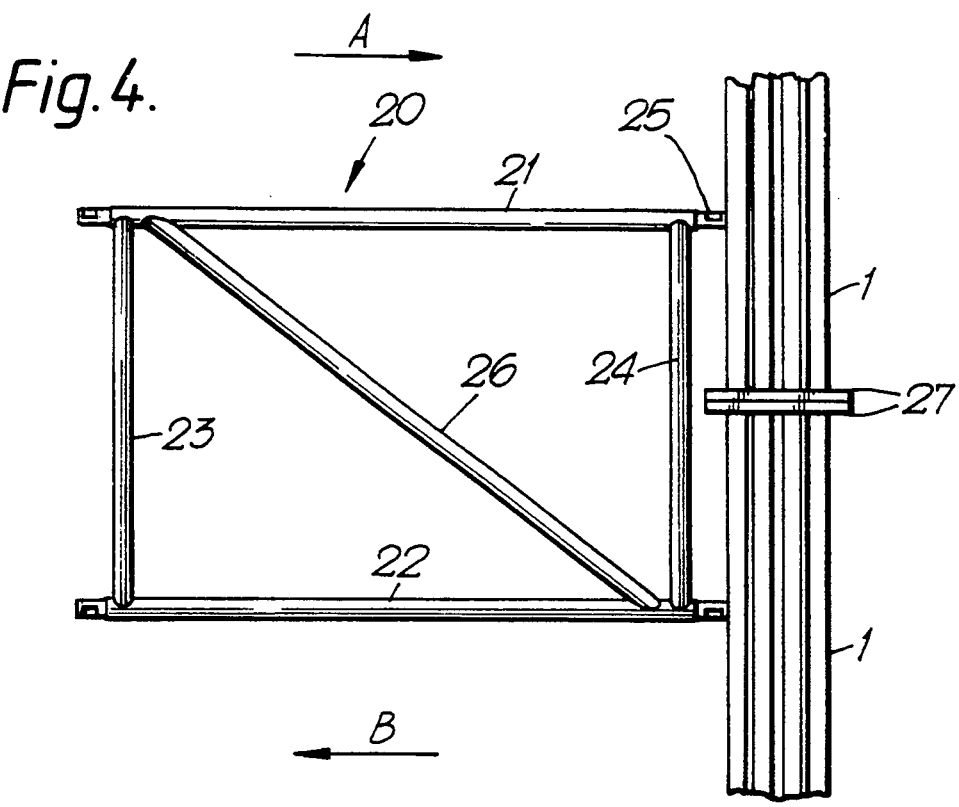
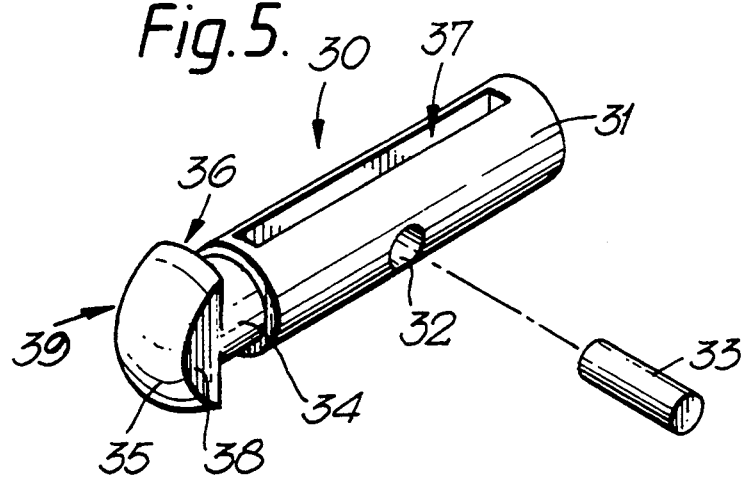

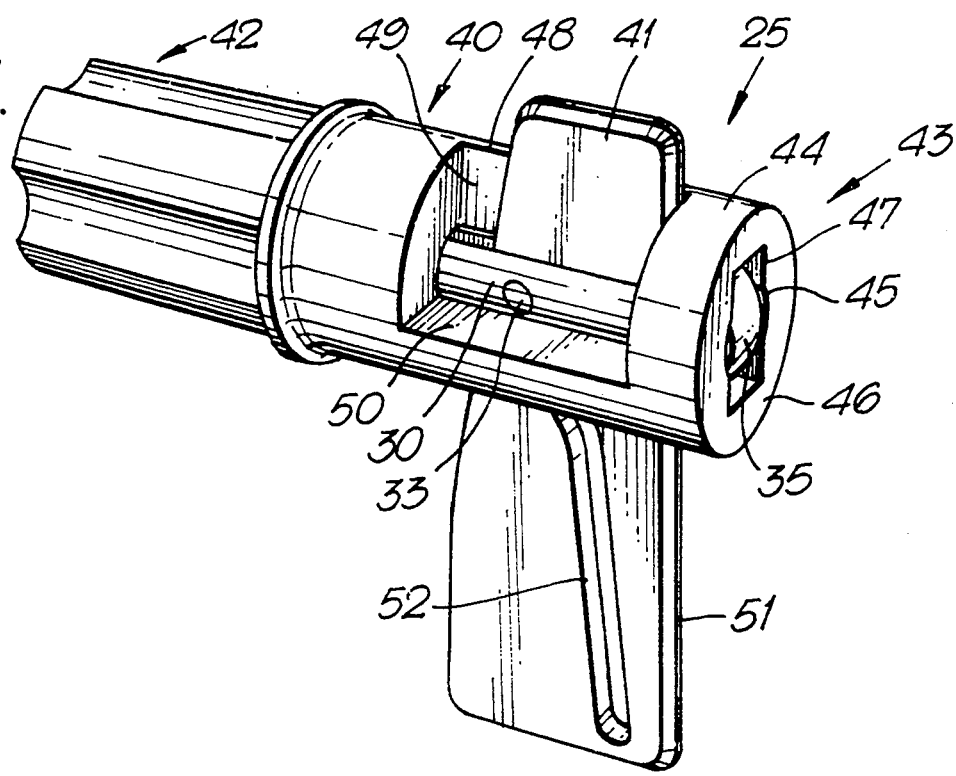
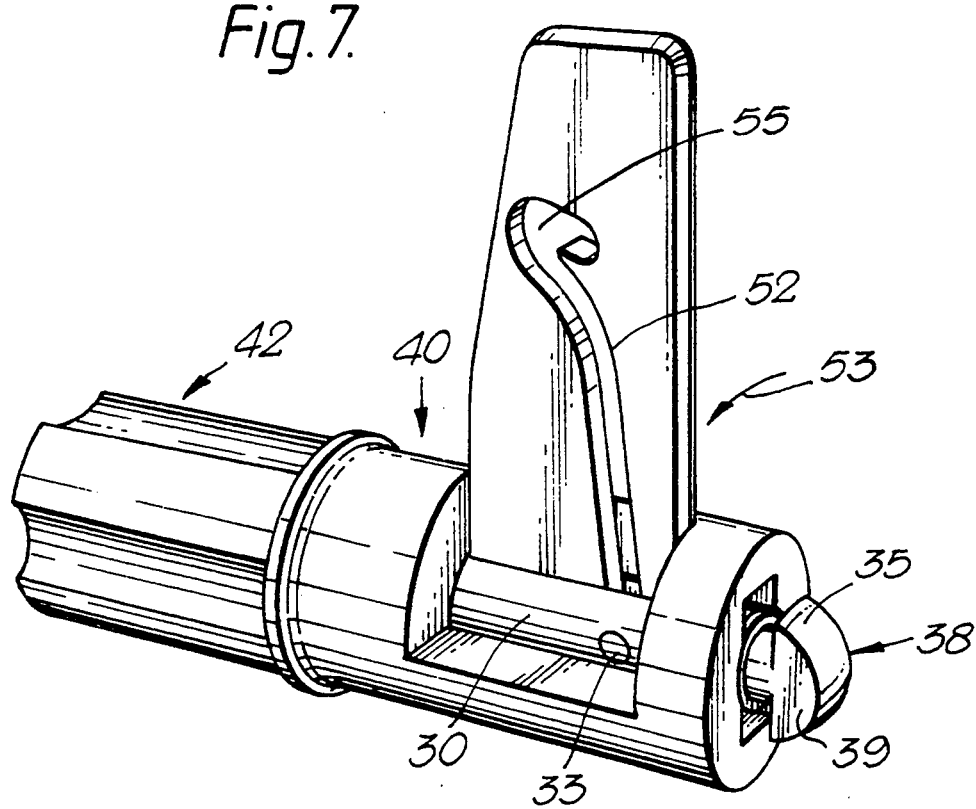

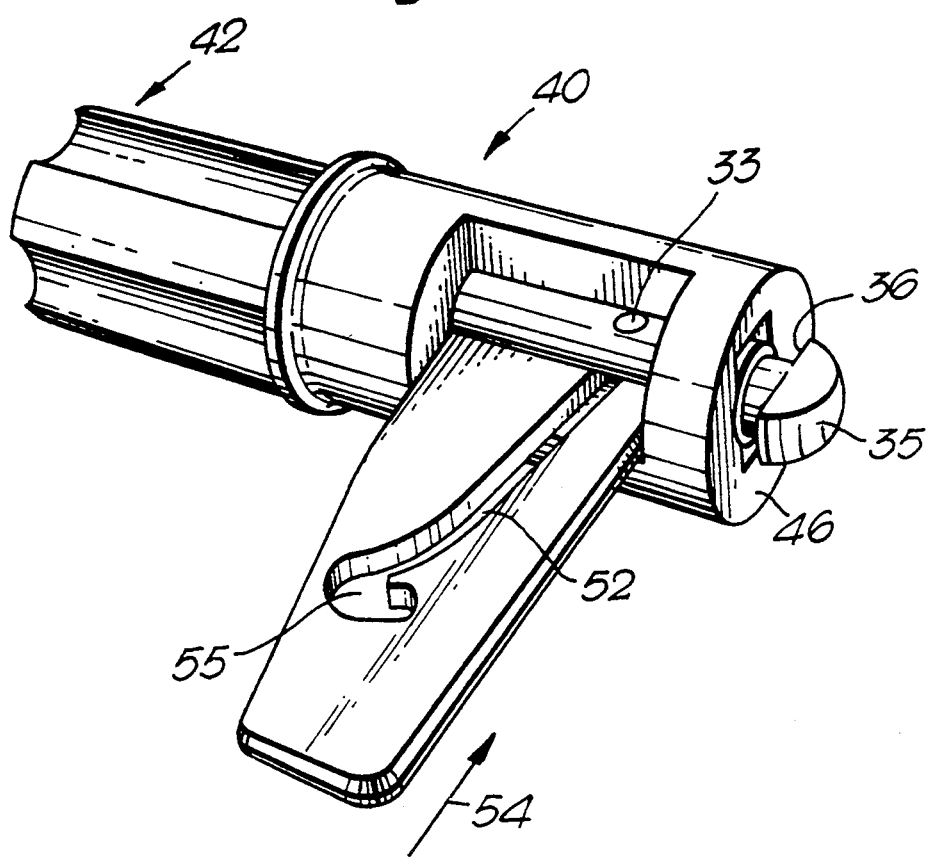

SHORING SYSTEM: A CONNECTOR FOR A SHORTING SYSTEM

This application is the U.S. counterpart to the United Kingdom application Ser. No 9127100.7, which was filed Dec. 20, 1991. Applicant claims the priority date of this foreign filing.

The present invention relates to a shoring system and more particularly relates to a connector for use in a shoring system.

It has been proposed previously to provide a shoring system in which a plurality of vertical legs are provided, each leg presenting axially extending slots on its outer surface, and frames or other elements adapted to be mounted between the legs. The frames are provided with connectors adapted to engage the slots formed in the legs. Typically these connectors are relatively complex and involve the use of spanners to operate the connectors.

The present invention seeks to provide an improved connector for a shoring system.

According to this invention there is provided a connector for a shoring system, the connector comprising a housing adapted to be mounted on a frame or the like to be connected to a plurality of axially extending channels, the housing slidably receiving a bolt, the bolt having a head shaped and dimensioned so that in one orientation, axial movement of the bolt may introduce the head through a slot into the channel defined by the leg, and in an alternate orientation the bolt may not be withdrawn from the channel by axial movement, the bolt being associated with means adapted to rotate the bolt and to move the bolt axially relative to the housing.

Preferably the head of the bolt is substantially dome-shaped, with two opposed parts of the head being cut-away to form substantially planar parallel faces spaced apart by a distance equal to the diameter of the part of the bolt supporting the head.

Conveniently the connector includes a plate, the plate defining a slot engaging part of the bolt, the plate being movable transversely relative to the housing, such transverse movement causing axial movement of the bolt, the plate, in at least one position, also being capable of undergoing a rotary motion about the axis of the bore receiving the bolt.

Advantageously the housing defines a cut-out portion adapted to receive the plate, the cut-out portion having, when viewed axially of the housing, an extent of at least substantially 90°, the housing also defining a slot on the opposite side of the bore from part of the cut-out, the slot being substantially co-aligned with one terminal face of the cut-out so that when the plate is in abutment with said terminal face, the plate may slide through the said slot.

Conveniently the housing defines a recess adjacent the said end face thereof adapted to receive the head of the bolt when the bolt is in a fully retracted position.

Advantageously the slot provided in the plate has a terminal substantially crook-shaped portion adapted to engage the pin and retain the bolt in a retracted position when the connector is inverted.

Figure 2:
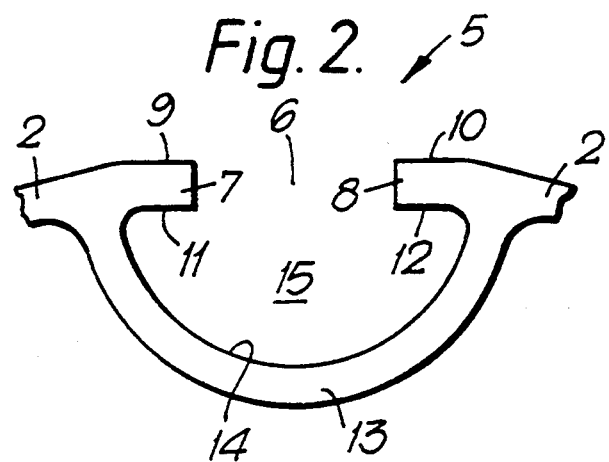

In order that the invention may be more readily understood, and so that further features thereof may be appreciated, the invention will now be described, by way of example, with reference to the accompanying drawings in which FIG. 1 is a cross-sectional view of an aluminium extrusion forming a shoring leg, FIG. 2 is an enlarged view of part of FIG. 1, FIG. 3 illustrates four types of frame which can be used with the leg of FIGS. 1 and 2, FIG. 4 illustrates part of a frame of FIG. 3 connected to a vertical shoring leg, the leg being formed of two interconnected leg sections, FIG. 5 is a perspective view of a bolt forming part of a catch mounted on a frame, FIG. 6 is a perspective view of the catch in an initial condition, FIG. 7 is a perspective view of the catch in a second position, and FIG. 8 is a view of the catch in a third position.

Referring initially to FIGS. 1 and 2 of the drawings, a shoring leg is formed of an extrusion 1 of aluminum. The extrusion comprises an outer wall 2 which has a circular outer surface 3 and a circular inner surface 4, thus defining a circular wall of uniform cross-section, the pipe being provided with a plurality of equi-angularly spaced slot formations 5.

FIG. 2 illustrates a typical slot formation 5 to an enlarged scale. In the region of each slot 5 the outer wall 2 of the extrusion is interrupted. Each slot formation 5 defines an open slot 6 which is located between two inwardly directed lips 7, 8, the lips extending from the circular outer wall 2. The lips 7, 8 present flat outer faces 9, 10 which are co-aligned, the flat faces defining a plane which is perpendicular to the radius passing from the centre of the extrusion 1 to the centre of the slot 6. Thus the flat outer faces 9, 10 of the lips 7, 8 form a flat abutment surface against which an element to be connected to the extrusion may readily abut. The lips 9, 10 also have flat co-aligned inner faces 11, 12 which are parallel with the outer faces. These inner faces are designed to receive appropriate clamping means to enable items to be readily clamped to the leg.

Extending between the points on either side of the slot 6 where the lips 7, 8 engage the outer wall 2 is a substantially semi-circular web 13. The web is inwardly directed, in that the web is located on the interior of the pipe defined by the wall 2, rather than on the exterior thereof. The inner surface 14 of the web 13 thus defines, together with the lips 7 and 8, a channel 15 which communicates with the slot 6, the channel 15 having a substantially semi-circular base defined by the face 14 of the web 13 and a substantially planar top defined by the surfaces 11 and 12 of the inwardly directed lips 7 and 8.

Referring now to FIG. 3 a plurality of ledger frames are illustrated which can be used with the leg as described with reference to FIGS. 1 and 2. In each case the same reference numerals will be used to describe each of the frames.

Each frame 20 consists of tubular metal components welded together in a conventional manner. The metal components may be fabricated of aluminium, aluminium alloy or some other metal.

Each frame consists of a horizontally extending upper member 21 and a horizontally extending lower member 22. The members 21 and 22 are intended to span the space between two vertical legs. Each frame is provided with two vertical side members 23, 24. These members are not located at the ends of the upper and lower horizontal members 21, 22 but are spaced inwardly slightly from the ends of the horizontal members. The end parts of the horizontal members are constituted by latches 25 to be described hereinafter in greater detail, adapted to engage the slots formed in the legs described above. The latches are in alignment with the respective horizontal members, so that any shear force experienced by the horizontal members ma be applied directly, in alignment with the horizontal members, to the vertical.

It is to be appreciated that if a frame 20 such as that illustrated in FIG. 4 is subjected to a sheer force, with the upper part 21 moving in one direction, as indicated by the arrow A, and the lower part moving in the opposite direction as indicated by the arrow B, the resultant force will be applied directly to the legs by the connectors 25 which are co-aligned with the upper and lower elements of the frame. The connectors thus serve to transmit any force experienced by the frame directly to the leg without the frame acting to increase the force by applying a mechanical advantage to the force.

Each frame may be provided with one or more reinforcing members 26. The reinforcing members may extend diagonally or the reinforcing members may extend vertically, effectively dividing the frame into two regions, each region being provided with a diagonally extending reinforcing member. Other forms of reinforcement may be provided, although in some cases no reinforcement will be necessary.

FIG. 4 illustrates part of one of the frames of FIG. 3 connected to a vertical leg. The leg is formed from two sections of extrusion 1 as illustrated in FIGS. 1 and 2, the leg sections each terminating with a connector plate 27. The connector plates are bolted together in a conventional manner. It can be seen that the connector plates 27 project horizontally outwardly beyond the envelope defined by the extrusions 1. However, because the vertical member 23 provided on the frame 20 is spaced inwardly from the ends of the horizontally extending portions 21, 22, the frame 20 can be mounted with one connector 25 engaging the upper extrusion 1 and the lower connection 25 engaging the lower extrusion 1. It will thus be appreciated that the frame can be positioned virtually anywhere on a leg which comprises a plurality of inter-connected extrusions 1. Of course, a connector 25 cannot be located precisely where the connector plates 27 are positioned, but the connector 25 can be located at any other position on the leg.

A connector 25 as used on a frame 20 as mentioned above will now be described in greater detail.

FIG. 5 illustrates a principal component of the connector 25, the component comprising a bolt 30. The bolt 30 comprises a main cylindrical body portion 31. The body portion 31 defines a transversely extending bore 32 dimensioned to receive a transversely extending pin 33. In the orientation of the bolt illustrated in FIG. 5 the bore 32 extends horizontally.

At one end of the cylindrical body portion 31 is a reduced diameter axially extending peg 34 which carries a head 35. A vertically extending axial slot 37 is provided which extends from a point adjacent the head 35, along the axis of the peg 34 and along the axis of the main body portion 31 of the bolt 30, to a point adjacent the free end of the bolt.

The head 35 is in the form of a hemisphere mounted on the peg 34, with the planar base 36 of the hemisphere extending perpendicularly to the axis of the peg 34. Two opposed sides of the hemisphere have been cut away to define two flat faces 38, 39, the flat faces being parallel with each other and being spaced apart by a distance substantially equal to the diameter of the peg 34. It is to be understood that the head need not be precisely hemispherical, but may be only substantially hemispherical.

The bolt 30, as will now be described in greater detail with reference to FIG. 6 to 8, is mounted in a housing which is connected to the frame 20, and the bolt 30 is adapted to be moved so that the head 35 of the bolt can be advanced towards a slot 6 as formed in the leg 1, with the faces 38, 39 on the bolt in a vertical position so that the head 35 may be introduced through the slot 6 into a channel 15 as formed in the leg 1. The bolt is then adapted to be rotated through 90° so that the flat surface 36 provided on the head 35 can engage the flat faces 11 and 12 as defined by the lips 7 and 8 of the slot 6. The bolt is then adapted to be moved in a direction attempting to withdraw the bolt from the channel, so that the head 35 securely grips the channel 5.

Turning now to FIGS. 6 to 8 a latch 25 incorporating the bolt 30 of FIG. 5 is illustrated. The latch 25 comprises a casting 40, the bolt 30 (including the pin 33) and a wedge plate 41.

The casting 40 is elongate and generally cylindrical. One end 42 of the casting is a fluted spigot and is intended to be secured within one end of a tube such as the tube 21 or 22 forming one of the horizontal parts of the frame 20. The fluted spigot 42 of the casting 40 may be secured in position within the tube in any convenient way. The other end 43 of the casting presents a substantially cylindrical exterior 44 and defines an axially extending bore 45 which extends from the free end face 46 of the casting 40 axially towards the fluted end. In the end face 46 a rectangular recess 47 is formed dimensioned to receive the head 35 of the bolt 30.

The end portion 43 of the casting defines a cut-out 48 which extends from the cylindrical outer surface 44 to the bore 45. The cut-out has an angular extent, when the casting 40 is viewed axially, of 90°.

The cut-out, in the orientation of the casting as shown in FIG. 6, has a vertical face 49 and a horizontal face 50.

Co-aligned with the vertical face 49, on the opposite side of the axially extending bore 45, is a slot (not visible in the Figures), the slot being dimensioned to receive the wedge plate 41, when the wedge plate abuts the vertical face 49.

The wedge plate 41 is a plate having a linear side 51 and having formed therein an angularly inclined slot 52.

The wedge plate 41 is dimensioned to be received within the slot 37 formed in the bolt 30 and the pin 33 is dimensioned to be received within the slot 52 formed in the wedge plate 41.

In order to assemble the latch as thus far described, initially the bolt 30 is located in position in the axially extending bore 45, and the bolt is rotated so that the slot 37 is in a vertical position. The plate wedge 41 is then inserted into the slot 37, passing through the slot formed in the lower part of the casting 40. Finally, the pin 33 is introduced into the transverse bore 32 of the bolt 30, the pin also passing through the slot 52 in the wedge plate 41.

The latch is shown in an initial condition in FIG. 6. The wedge plate is in a lower-most position, that being the position that it will normally adopt under the influence of gravity when the latch is held in the orientation illustrated. In this position the bolt 30 is in a fully retracted position with the head 35 of the bolt being received within the recess 47. Thus the total dimension of the frame 20 provided with two latches such as the latch 25 will be the distance between the end faces 46 on the castings forming the latches. This distance may be made to be the desired spacing between the opposed faces of two legs enabling the frame to be offered up to the legs with a lateral movement.

When the head 35 of the bolt is aligned with a slot 6 as formed in the leg 1, the wedge plate 41 may be lifted, to a position as shown in FIG. 7. As the wedge plate is lifted, the pin 33 rides along the inclined slot 52, thus moving the bolt towards the right as illustrated in FIGS. 6 and 7. The bolt is in such an orientation that the faces 38 and 39 formed on the head 35 of the bolt are vertical, and the distance between these faces is such that the head of the bolt may be introduced into the channel 15 formed behind the slot 6 in the leg 1.

When the bolt is in this condition the wedge plate 41 may be moved rotationally about the axis of the casting 40 as generally indicated by the arrow 52 in FIG. 7. The wedge plate then occupies the position illustrated in FIG. 8. Rotating the wedge plate 41 causes the bolt 30 to rotate since the wedge plate passes through the slot 37 defined in the bolt. This means that the head 35 of the bolt rotates through 90°. The flat undersurface 36 of the head of the bolt is thus opposed to the flat faces 11 and 12 defined by the inwardly directed lips 7 and 8 of the slot 5.

If the wedge plate 41 is then moved towards the right as shown in FIG. 8, as indicated by the arrow 54, the pin 33 will again be moved along the slot 52 in the wedge plate, thus tending to withdraw the bolt back into the casting 40. The flat undersurface 36 of the head of the bolt may thus be brought into secure engagement with the flat surfaces 11 and 12 defined by the inwardly directed lips 7 and 8 while the end face 46 of the casting is brought into firm engagement with the flat faces 9 and 10 defined by the outer faces of the inwardly directed lips 7 and 8. The wedge plate may be driven home, for example, with the assistance of a hammer, thus ensuring that a secure connection is established between the frame 20 and the extrusion 1.

When the frame is to be disengaged from the extrusion the end of the wedge plate projecting from the casting 40, in the position as illustrated in FIG. 8, may be struck with a hammer, thus tending to move the wedge plate towards the left as shown in FIG. 8, in the opposite direction to that indicated by the arrow 54. This will tend to loosen the connection enabling the wedge plate then to be rotated back to the vertical position of FIG. 7. The wedge plate may then be released. The wedge plate will drop under the force of gravity withdrawing the bolt from the channel 15, and returning the connector to the position illustrated in FIG. 6.

It is to be noted, from FIGS. 7 and 8 that the end of the slot 52 formed in the wedge plate has a crook-shaped portion 55. Whilst it is intended that the connectors will be utilised in the orientation illustrated and described above, it is conceivable that the connectors may be used in an inverted position. If the connectors are used in such an inverted position instead of the wedge plate 41 automatically adopting the initial position as illustrated in FIG. 6, gravity will tend to cause the plate 41 to occupy an alternate position in which the bolt is in a projected position. However, if the connector is inverted the crook-shaped portion 54 of the slot 52 may be engaged with the pin to retain the wedge plate in an elevated position until the frame has been offered up to the legs to which the frame is to be connected. The plate 41 may then be moved to engage the pin 33 with the substantially linear portion of the slot 52, enabling the plate then to move transversely of the axis of the bore 45 formed in the casting 40 to move the bolt to a protracted position, equivalent to the position shown in FIG. 7.

It is to be appreciated that the casting 40 is securely connected to the exterior of the leg 1, and any forces experienced by the tube 21 or 22 connected to the casting 40 are transferred directly by the casting 40 and the associated bolt 30 to the leg 1, in a direction aligned with the axis of the tube 21 or 22.

In utilising a connector of the type described above it is only necessary to use a hammer, thus minimising the number of tools to be used by a scaffolder erecting a shoring system using legs, frames and connectors of the type described above.

What is claimed is:

1. A connector for a shoring system, the connector comprising:

a housing adapted to be mounted on a frame or the like to be connected to a plurality of axially extending channels, the housing slidably receiving a bolt having a head shaped and dimensioned so that in one orientation, axial movement of the bolt may introduce the head through a slot into the channel defined by the leg, and in an alternate orientation the bolt may not be withdrawn from the channel by axial movement, the bolt being associated with means adapted to rotate the bolt and to move the bolt axially relative to the housing; and a plate, the plate defining a slot engaging part of the bolt, the plate being movable transversely relative to the housing, such transverse movement causing axial movement of the bolt, the plate, in at least one position, also being capable of undergoing a rotary motion about the axis of the bore receiving the bolt.

2. A connector according to claim 1 wherein the head of the bolt is substantially dome-shaped, with two opposed parts of the head being cut-away to form substantially planar parallel faces spaced apart by a distance equal to the diameter of the part of the bolt supporting the head.

3. A connector according to claim 1 wherein the housing defines a recess adjacent an end face thereof adapted to receive the head of the bolt when the bolt is in a fully retracted position.

4. A connector according to claim 1 wherein the slot provided in the plate has a terminal substantially crook-shaped portion adapted to engage the pin and retain the bolt in a retracted position when the connector is inverted.

5. A connector according to claim 1 wherein the housing defines a cut-out portion adapted to receive the plate, the cut-out portion having, when viewed axially of the housing, an extent of at least substantially 90°, the housing also defining a slot on the opposite side of the bore from part of the cut-out, the slot being substantially co-aligned with one terminal face of the cut-out so that when the plate is in abutment with said terminal face, the plate may slide through the said slot.

* * * * *

UNITED STATES PATENT AND TRADEMARK OFFICE
CERTIFICATE OF CORRECTION

PATENT NO. : 5,344,258

DATED : September 6, 1994

INVENTOR(S) : Demetrios G. Papadopoulos

It is certified that error appears in the above-identified patent and that said Letters Patent is hereby corrected as shown below:

On title page, item [54] and col. 1, line 3,

Delete "Shorting" and insert --Shoring--.

Signed and Sealed this

Tenth Day of January, 1995

Attest:

BRUCE LEHMAN

Attesting Officer

Commissioner of Patents and Trademarks